United States Patent
Prestenback et al.

(10) Patent No.: US 8,593,924 B2
(45) Date of Patent: *Nov. 26, 2013

(54) SYSTEM AND METHOD FOR INITIALIZATION OF MEDIA ASSET MODULES FOR IMPROVED EXECUTION SEQUENCE ON A PLAYBACK ENVIRONMENT

(71) Applicant: Disney Enterprises, Inc., Burbank, CA (US)

(72) Inventors: Kyle Prestenback, Burbank, CA (US); Arnaud Robert, Simi Valley, CA (US)

(73) Assignee: Disney Enterprises, Inc., Burbank, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 13/717,490

(22) Filed: Dec. 17, 2012

(65) Prior Publication Data

US 2013/0107684 A1 May 2, 2013

Related U.S. Application Data

(63) Continuation of application No. 13/183,352, filed on Jul. 14, 2011, now Pat. No. 8,355,305.

(51) Int. Cl.
*G11B 20/00* (2006.01)

(52) U.S. Cl.
USPC .................. 369/53.44; 369/124.08

(58) Field of Classification Search
None
See application file for complete search history.

(56) References Cited

U.S. PATENT DOCUMENTS

| | | | | |
|---|---|---|---|---|
| 6,128,712 A * | 10/2000 | Hunt et al. | ..................... | 711/158 |
| 2005/0117883 A1* | 6/2005 | Kim et al. | ........................ | 386/95 |
| 2009/0307723 A1* | 12/2009 | Prestenback et al. | ........... | 725/39 |
| 2010/0260016 A1* | 10/2010 | Ikeda et al. | ................. | 369/30.08 |
| 2010/0302923 A1* | 12/2010 | Loi et al. | .................... | 369/47.55 |

* cited by examiner

*Primary Examiner* — Paul Huber
(74) *Attorney, Agent, or Firm* — Farjami & Farjami LLP

(57) ABSTRACT

There is provided a system and method for initialization of media asset modules for an improved execution sequence on a playback environment. The system includes a player application configured to segment media assets associated with a primary media content into a plurality of asset modules, assemble the plurality of asset modules into a media file, identify a first subset of asset modules from the plurality of asset modules for loading in a first loading process, determine a loading sequence for the first subset of asset modules, and load the first subset of asset modules according to the loading sequence before beginning playback of the primary media content. The player application may be further configured to identify, determine another loading sequence for, and load additional asset modules after playback of the primary media content has begun.

16 Claims, 4 Drawing Sheets

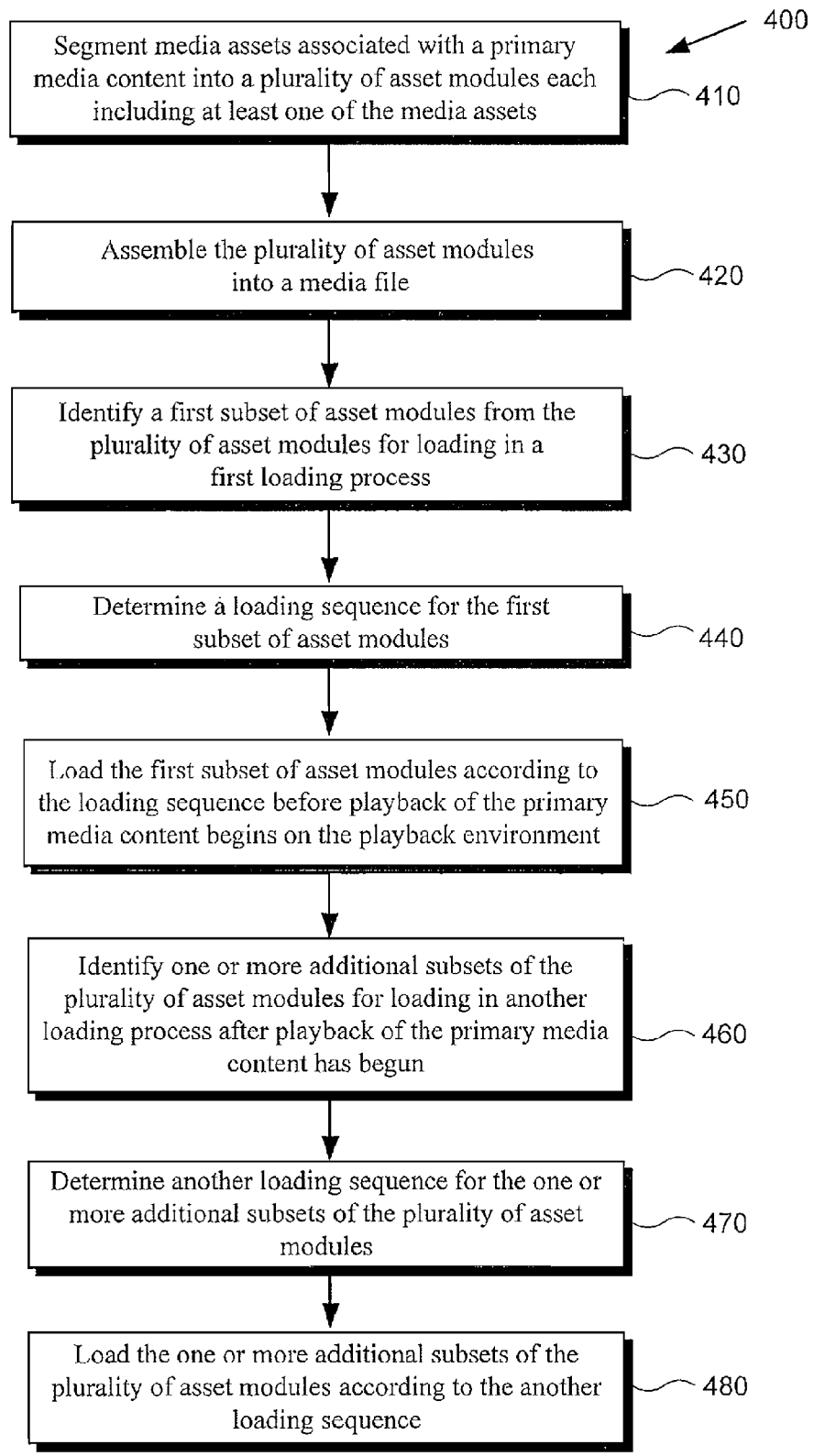

SYSTEM AND METHOD FOR INITIALIZATION OF MEDIA ASSET MODULES FOR IMPROVED EXECUTION SEQUENCE ON A PLAYBACK ENVIRONMENT

This application is a Continuation of U.S. patent application Ser. No. 13/183,352 filed on Jul. 14, 2011.

BACKGROUND OF THE INVENTION

1. Field of the Invention

The present invention relates generally to the presentation of media content on a playback environment. More particularly, the present invention relates to the initialization of media assets on a playback environment.

2. Background Art

Initial loading of media assets from an optical storage medium, such as Blu-ray Disc™ optical discs, for example, into a playback environment, such as a Blu-ray Disc player, is well known in the art. Blu-ray Disk is a trademark owned by the Blu-ray Disk Association (BDA) in the United States and other jurisdictions. For example, a Blu-ray Disc player may be configured to load all media assets from an inserted media disc before giving the user the ability to playback the primary media content stored on the media disc, e.g. a feature film or other movie content. By loading all of the media assets from the media disc into the disc player memory, the disc player ensures that the user may not be required to spend additional time waiting for assets to load after the disc player begins allowing the user access to the interactive contents on the media disc. By loading all media assets from the media disc initially, the remainder of the user's experience in enjoying the primary media content may proceed with minimal media, asset loading interruptions.

Unfortunately, loading all assets from a high density Blu-ray Disc or other high-definition (HD) optical disc, for example, into a disc player memory at initialization may result in a significant waiting period before the user can begin to enjoy the primary media content. It may be typical for this wait period to last three or more minutes before a typical HD optical disc player finishes loading all available media assets from the media disc into the media disc player memory. That delay, over which the user has no control, may be a substantial source of frustration for the user, thereby reducing user enjoyment.

Accordingly, there is a need to overcome the drawbacks and deficiencies in the art by reducing media playback initiation time on a playback environment.

SUMMARY OF THE INVENTION

There are provided methods and systems for initialization of media asset modules for improved sequence execution on a playback environment, substantially as shown in and/or described in connection with at least one of the figures as set forth more completely in the claims.

BRIEF DESCRIPTION OF THE DRAWINGS

The features and advantages of the present invention will become more readily apparent to those ordinarily skilled in the art after reviewing the following detailed description and accompanying drawings, wherein:

FIG. 4 shows a flowchart describing the steps, according to one embodiment of the present invention, of a method for initialization of media asset modules for an improved execution sequence on a playback environment.

DETAILED DESCRIPTION OF THE INVENTION

The present application is directed to a system and method for initialization of media assets for an improved execution sequence on a playback environment. The following description contains specific information pertaining to the implementation of the present invention. One skilled in the art will recognize that the present invention may be implemented in a manner different from that specifically discussed in the present application. Moreover, some of the specific details of the invention are not discussed in order not to obscure the invention. The specific details not described in the present application are within the knowledge of a person of ordinary skill in the art. The drawings in the present application and their accompanying detailed description are directed to merely exemplary embodiments of the invention. To maintain brevity, other embodiments of the invention, which use the principles of the present invention, are not specifically described in the present application and are not specifically illustrated by the present drawings.

Figure 1:
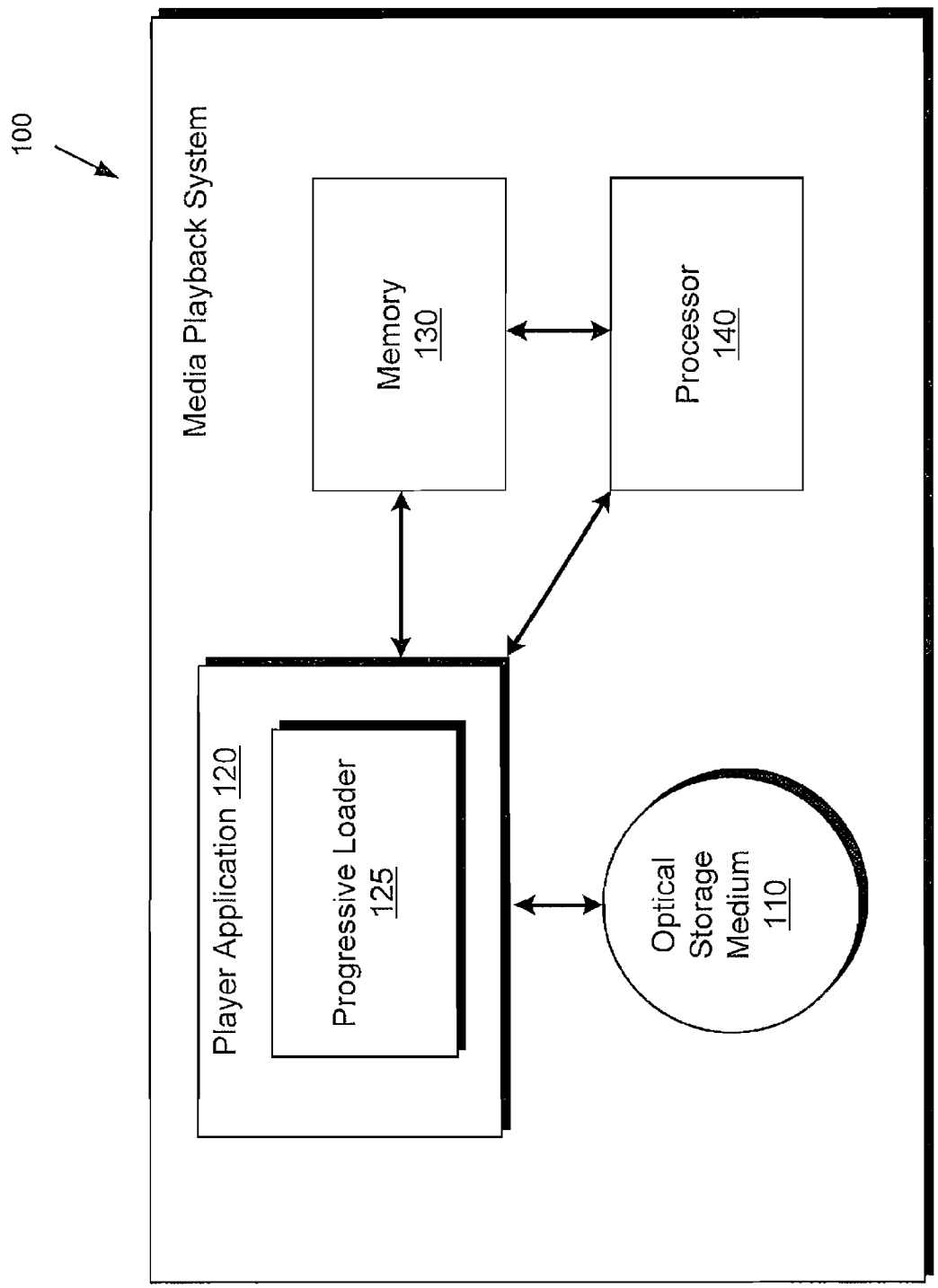
FIG. 1 presents a diagram of a system for initialization of media asset modules for an improved execution sequence on a playback environment, according to one embodiment of the present invention.

FIG. 1 presents a diagram of a system for initialization of media asset modules for an improved execution sequence on a playback environment, according to one embodiment of the invention. Media playback system 100 includes optical storage medium 110, player application 120, memory 130, and processor 140. Player application 120 includes progressive loader 125.

Media playback system 100 may be any type of digital playback environment, such as, for example, a Blu-ray Disc™ or other high-definition (HD) optical disc player. Media playback system 100 may perform playback of data on optical storage medium 110 inserted into media playback system 100. Media playback system 100 may be equipped with a single optical head reader device (not shown in FIG. 1) for reading and extracting data from optical storage medium 110 into memory 130.

Optical storage medium 110 may be a data storage medium such as, for example, a Blu-ray Disc™. Optical storage medium 110 may store both primary media content, such as video footage or movie content, for example, and media assets, such as user interface elements related to main menus, submenus of main menus, timeline menus, popup menus associated with the primary media content, and any other interactive elements designed to allow users to interact more deeply with the primary media content.

Player application 120 may be a software application stored within media playback system 100 and designed to control the inner functionalities of media playback system 100. Player application 120 may control the usage of memory 130 and processor 140. Memory 130 may be any type of memory hardware such as, for example, a two-gigabyte (Gb) random access memory (RAM) chip. Processor 140 may be any type of central processing unit (CPU) such as an Intel Pentium™ processor, for example. Progressive loader 125 may be a software module incorporated into player application 120. Progressive loader 125 may be implemented as a progressive loading routine for loading media assets from optical storage medium 110 into memory 130 prior to, during, or after the playback of primary media content. For example, player application 120 may begin loading media assets from optical storage medium 110 into memory 130 as soon as player application 120 may detect the presence of optical storage medium 110 within media playback system 100.

As previously described, optical storage medium 110 may contain primary media content and a plurality of media assets associated with the primary media content. For player application 120 to obtain progressively the media assets associated with the primary media content, player application 120 may initially determine all media assets associated with the primary media content. Once the media assets may be ascertained, player application 120 may create a reference for each of the media assets and may segment all of the media assets associated with the primary media content into one or more asset modules with each asset module including at least one of the media assets. Segmenting may comprise player application 120 grouping together references to the media assets and inserting the references into the plurality of asset modules. Each reference may be digital data containing information regarding a particular media asset, such as the media asset location within optical storage medium 110. Each asset module may be a data file capable of storing data. Player application 120 may be designed to group only references of the same type of media assets into an asset module. For example, player application may group references to media assets from the main menu into one asset module, and references to media assets of a submenu of the main menu into another asset module. In another embodiment of the invention as shown in FIG. 1, player application 120 may segment less than all of the media assets associated with the primary media content into asset modules. After the one or more asset modules are fully created, the asset modules may be stored into a media file, which may be loaded into memory 130.

Segmenting media assets into asset modules may be based upon other criteria defined by media playback system 100 and/or optical storage medium 110. For example, segmenting the media assets may also be performed according to at least one of a main execution sequence associated with the primary media content, and a background execution sequence associated with the main execution sequence. The main execution sequence may be a predetermined execution sequence media playback system 100 may directly execute in order to playback the primary media content. The main execution sequence may require use of one or more media assets during its execution and references to those media assets may be grouped into an asset module during segmenting of the media assets. Segmenting the media assets may also be performed according to one or more background execution sequences associated with the main execution sequence. A background execution sequence may be a set of subroutine sequences executed by the main execution sequence. References to media assets that may be required by the background execution sequence may be grouped into another asset module.

Once player application 120, using progressive loader 125, may have successfully created and loaded a media file containing one or more asset modules into memory 130, player application 120 may proceed to identify a subset of the asset modules from the one or more asset modules for loading from optical storage medium 110 into memory 130 in a first loading process. The first loading process may be a process of copying media assets stored in optical storage medium 110 into memory 130 prior to initial playback of primary media content. According to the embodiment of the invention shown in FIG. 1, player application 120 may identify a predefined set of required media assets associated with the primary media content. The predefined set of required media assets may be a data file located within optical storage medium 110 or media playback system 100. The predefined set of required media assets may contain data indicating the media assets that must be stored into memory 130.

In alternative embodiments of the invention, player application 120 may identify the subset of asset modules based on at least one of playback capabilities of the playback environment, user preferences, and user usage histories. Playback capabilities of the playback environment or media playback system 100 may include the network connectivity of media playback system 100 and other software and hardware specifications of media playback system 100. User preference may comprise one or more preferences set within media playback system 100. User preferences may include various popup menus, submenus, and other interactive elements programmed to occur during playback of the primary media content. User usage histories may comprise user habits detected by player application 120 from previous uses of media playback system 100. For example, during prior playbacks, the user may have consistently launched a particular popup menu at the midpoint of the primary media content. Based upon this usage history, player application 120 may decide to include the asset module containing reference to that particular popup menu for loading.

After player application 120 identifies the subset of asset modules from one or more asset modules to load into memory 130, player application 120 may further determine a loading sequence for the media assets contained in the subset of asset modules. According to the embodiment of the invention shown in FIG. 1, player application 120 may receive a predefined required loading sequence associated with the primary media content from media playback system 100 or optical storage medium 110. The predefined required loading sequence may be any type of data file containing information indicating the order for loading all of the media assets referenced in the subset of asset modules. In alternative embodiments of the invention, the loading sequence may be based on at least one of the playback capabilities of the playback environment, user preferences, and user usage histories. Playback capabilities of the playback environment, user preferences and user usage histories have been described earlier.

Upon determining a loading sequence for the first subset of asset modules, player application 120 may load the subset of media assets associated with the subset of asset modules according to the loading sequence before playback of the primary media content begins on the playback environment. To illustrate this process, if the subset of asset modules comprises references to graphical user interface elements of the main menu, which allows for playback of the primary media content, then the actual graphical user interface elements may be loaded into memory 130 according to the loading sequence prior to any playback of the primary media content. Once the graphical elements of the main menu have been loaded into memory 130, player application 120 may present the graphical element for user interaction. The loaded graphical elements may reside within memory 130 during and beyond the entire playback of the primary media content.

The remainder of the media assets referenced in the remainder of the asset modules may be loaded into memory 130 after the first subset of asset modules have been loaded. Player application 120 may identify one or more additional subsets of asset modules for loading in another loading process after playback of the primary media content has begun, and determine another loading sequence for the one or more additional subsets of asset modules. Player application 120 may then load the one or more additional subsets of asset modules according to another loading sequence into memory. The identifying the one or more additional subsets of the plurality of asset modules may be performed at one or more predefined execution moments or in response to one or more execution events.

A predefined execution moment or event may comprise a user induced state change. A user induced state change may occur when the user decidedly changes the state of the playback of the primary media content. For example, the primary media content may be in playback mode and the user may decide to skip forward or backward through the primary media content. By attempting to skip forward or backward, the user may cause player application 120 to load a timeline menu into memory 130 or other media assets associated with the skipping for user to interact with. In other embodiments of the invention, a predefined execution moment or event may comprise an instance in, or a progression through, a main execution sequence associated with the primary media content or in a background execution sequence associated with the main execution sequence. The triggering instance or event may be a predetermined moment or event during the execution of the main execution sequence or background execution sequence for playback of primary media content.

Therefore, player application 120, using progressive loader 125, may allow media playback system 100 to load into memory 130 only a subset of all the media assets associated with the primary media content prior to playback. Once playback of primary media content begins player application 120 may progressively load the remaining media assets associated with the primary media content into memory 130. By loading only a subset of the media modules prior to playback of the primary media content, media playback system 100 improves the execution sequence on a playback environment and, thereby, reduces the initial playback wait time.

In some situations memory 130 may provide storage space for only a portion of the media assets in the media file. If memory 130 lacks adequate storage space to store a media asset, then player application 120 may perform a deletion of one or more media assets from memory 130. In the embodiment of the invention as shown in FIG. 1, the deletion process may be a first in, first out (FIFO) content removal process. Under FIFO content removal process, player application 120 may seek to delete from memory 130 a media asset that has been present in memory 130 for the longest time period. Once the oldest media asset has been removed from memory 130, player application 120 may again determine whether there may be adequate storage space. If adequate storage space is detected, player application 120 may load media asset from optical storage medium 110 into memory 130. If adequate storage space is not detected, player application 120 may perform one or more FIFO deletions on the remaining media assets in memory 130 until adequate storage space has been created the newest media asset. In alternative embodiments of the invention as shown in FIG. 1, any type of deletion algorithm may be used to free memory 130 storage space to store the newest media asset.

During loading of a media asset from optical storage medium 110 into memory 130, player application 120 may be required to stop playback of primary media content and to discontinue receiving user inputs into media playback system 100. As stated earlier, media playback system 100 may have one optical head reader device to access contents within optical storage medium 110. If the optical head reader device may be needed to extract a media asset from optical storage medium 110 then that optical head reader device cannot be used to read the primary media content from optical storage medium 110 or to perform other functions. Therefore, during loading of a media asset from optical storage medium 110 into memory 130, playback of primary media content may temporarily stop and user inputs into media playback system 100 may be ineffective.

Figure 2:
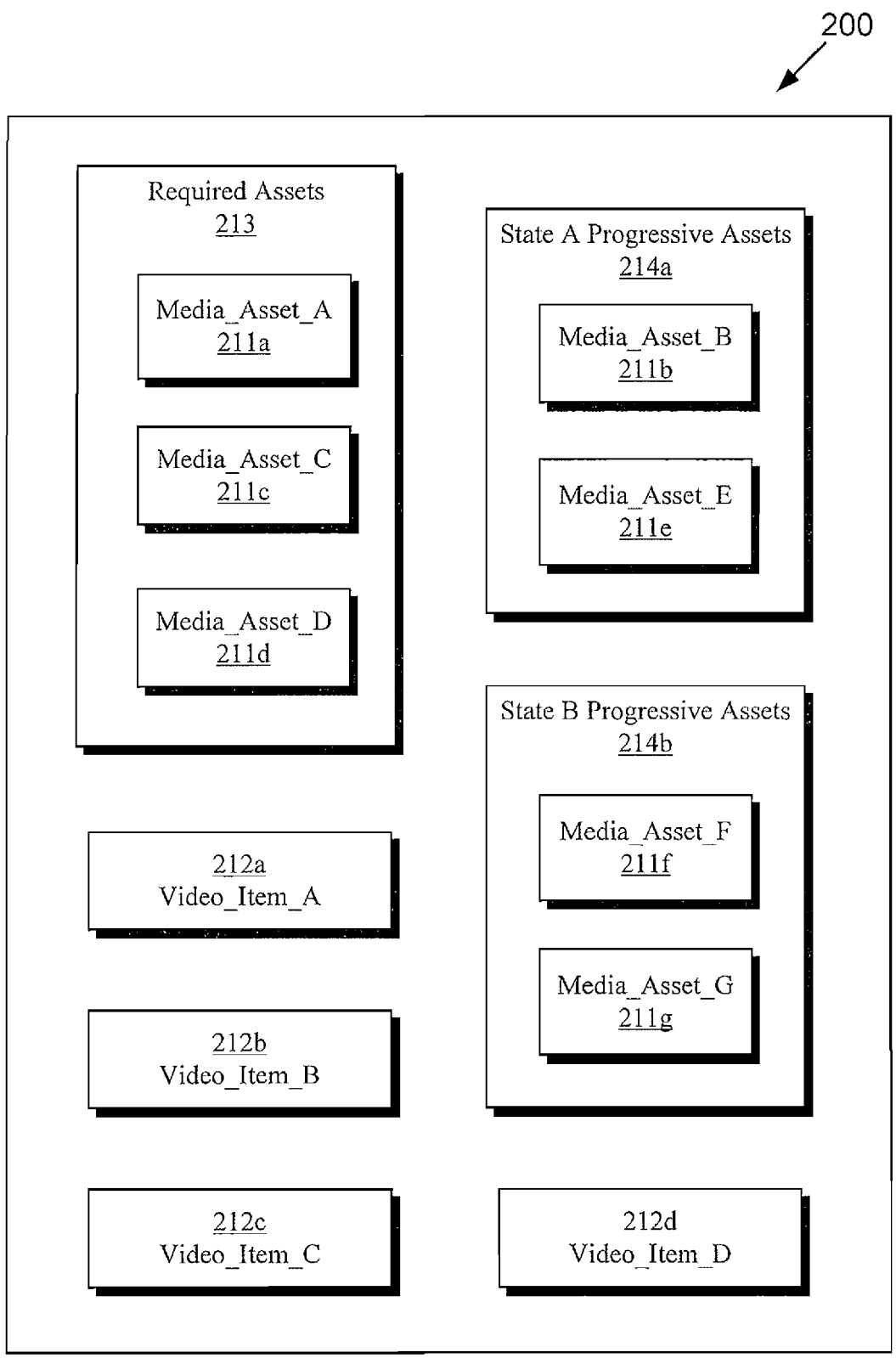
FIG. 2 presents a block diagram showing how media assets associated with primary media content may be segmented and organized, according to one embodiment of the present invention.

Moving to FIG. 2, FIG. 2 presents a block diagram 200 showing the contents that may be stored within optical storage medium 110 of FIG. 1 to further illustrate how player application 120 of FIG. 1 may determine which media assets to load into memory 130 of FIG. 1. Block diagram 200 of FIG. 2 includes primary media content and media assets associated with the primary media content. As shown in FIG. 2, primary content may include video_item_A 212a, video_item_B 212b, video_item_C 212c, and video_item_D 212d. As further shown by FIG. 2, the media assets associated with the primary content include required assets 213, state "A" progressive assets 214a, state "B" progressive assets 214b. Required assets 213 includes media_asset_A 211a, media_asset_C 211c, and media_asset_D 211d. State "A" progressive assets 214a includes media_asset_B 211b and media_asset_E 211e. State "B" progressive assets 214b includes media_asset_F 211f and media_asset_G 211g.

Playback of the primary media content may comprise playback of video_item_A 212a, video_item_B 212b, video_item_C 212c, and video_item_D 212d. Required assets 213, which may correspond to a predefined set of required media assets associated with the primary media content, may be loaded into memory 130, in FIG. 1, prior to playback of the primary media content. For example, media_asset_A 211a, media_asset_C 211c, and media_asset_D 211d may each be a reference to a particular media asset residing in optical storage medium 110. As previously described, player application 120 may rely on the references to locate and load the referenced media assets.

Once initial playback of the primary media content begins, state "A" progressive assets 214a and state "B" progressive assets 214b may be used to determine when to load other media assets. State "A" progressive assets 214a and state "B" progressive assets 214b may both be data files containing references to media assets. As described previously, during playback of primary media content 210, a user may induce a state change. A state change into state "A" may require media assets referenced in media_asset_B 211b and media_asset_E 211e of state "A" progressive assets 214a to be loaded into memory 130. Likewise, a user induced state change into state "B" may require the loading of media assets referenced in media_asset_F 211f and media_asset_G 211g of state "B" progressive assets 214b to be loaded into memory 130.

Figure 3:
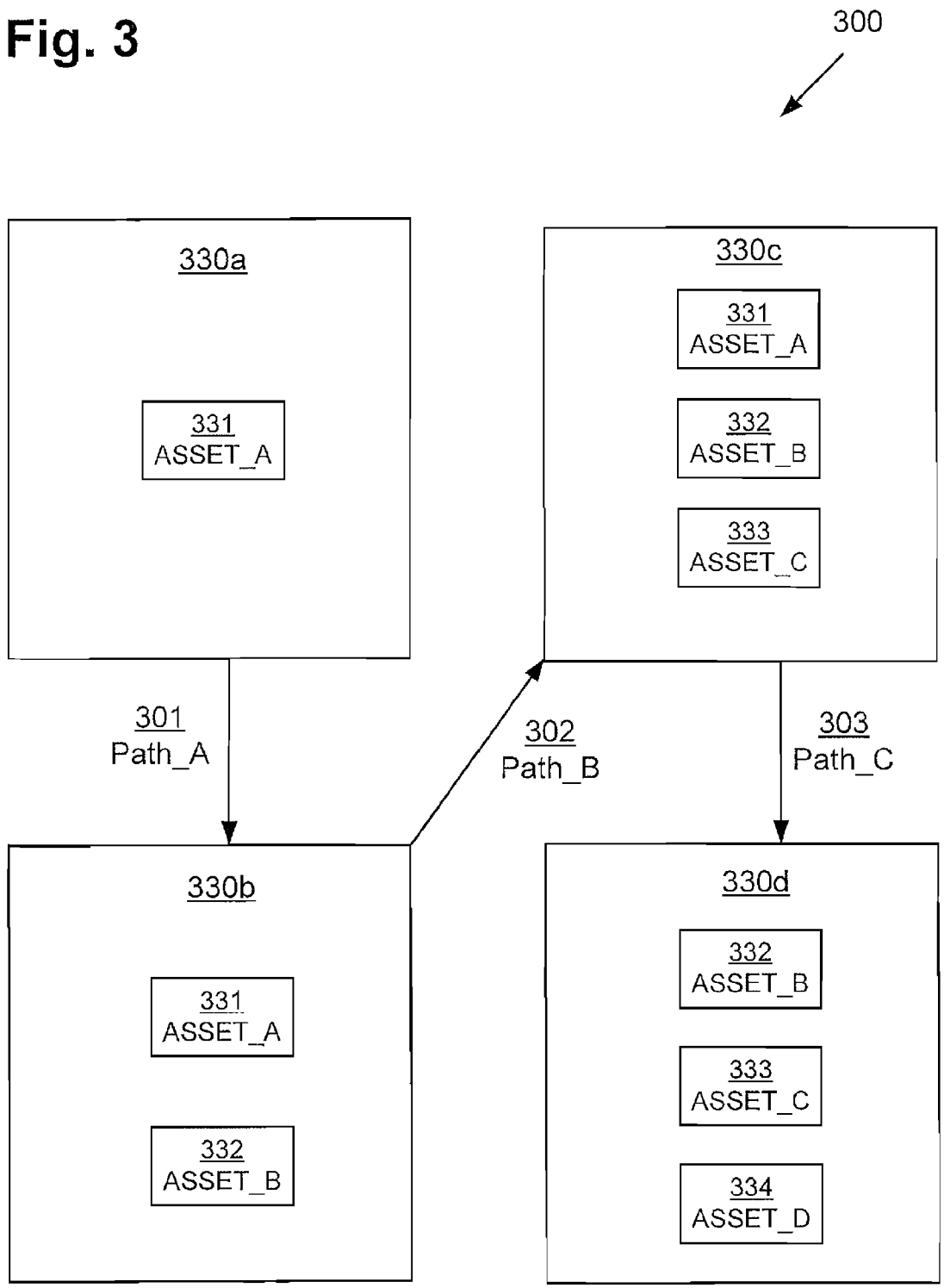
FIG. 3 is a block diagram illustrating management of one or more media assets stored within memory, according to one embodiment of the present invention.

Moving to FIG. 3, FIG. 3 is a block diagram 300 illustrating the management of one or more media assets stored within memory 130 of FIG. 1, according to one embodiment of the present invention. Block diagram 300 in FIG. 3 includes memory 330a, 330b, 330c, and 330d, path_A 301, path_B 302, and path_C 303. Each of memory 330a, 330b, 330c, and 330d may correspond to the same memory 130 of FIG. 1 but may correspond to memory 130 at different times during initialization and playback of primary media content and thus contain different respective groups of media assets. Memory 330a includes asset_A 331. Memory 330b includes asset_A 331 and asset_B 332. Memory 330c includes asset_A 331, asset_B 332, and asset_C 333. Memory 330d includes asset_B 332, asset_C 333, and asset_D 334. Asset_A 331, asset_B 332, asset_C 333, and asset_D 334 are actual media assets stored in optical storage medium 110 of FIG. 1.

Memory 330a may be initially loaded with asset_A 331 prior to playback of the primary media content. Path_A 301 may represent the loading of asset_B 332 into memory 330*a* in response to a user induced state change, a main execution sequence, or a background execution sequence. Once asset_B 332 is loaded into memory 330*a*, memory 330*a* may be referred to as memory 330*b*. Path_B 302, similar to path_A 301, may represent the loading of asset_C 333 into memory 330*b*. Once asset_C 333 is loaded into memory 330*b*, memory 330*b* may be referred to as memory 330*c*. Path_C 303 may represent the loading of asset_D 334 into memory 330*c*. However, the storage capacity of memory 330*c* may be fully exhausted and a deletion of one or more of the media assets stored within memory 330*c* may be appropriate. As described earlier, player application 120 of FIG. 1 may perform a FIFO memory content removal on the media assets stored within memory 330*c*. The FIFO memory content removal process may delete the oldest media asset, which is media asset, asset_A 331. After the removal of asset_A 331, asset_D 334 may be stored into memory 330*c* and memory 330*c* may be referred to as memory 330*d*. If removal of asset_A 331 does not generate enough storage space on memory 130, player application 120 may performed additional FIFO content removal operations until enough storage space is freed to store asset_D 334.

Moving on to FIG. 4, FIG. 4 shows a flowchart describing the steps, according to one embodiment of the present invention, of a method for initialization of media asset modules for an improved execution sequence on a playback environment. Certain details and features have been left out of flowchart 400 that are apparent to a person of ordinary skill in the art. For example, a step may comprise one or more sub-steps or many involve specialized equipment or materials, as known in the art. While steps 410 through 480 indicated in flowchart 400 are sufficient to describe one embodiment of the present invention, other embodiments of the invention may utilize steps different from those shown in flowchart 400, or may include more, or fewer, steps.

Referring to step 410 in FIG. 4 and media playback system 100 of FIG. 1, step 410 of flowchart 400 comprises segmenting media assets associated with a primary media content into a plurality of asset modules each including at least one of the media assets. As described earlier, optical storage medium 110 may comprise primary media content and a plurality of media assets associated with the primary content. Upon receiving optical storage medium 110 into media playback system 100, player application 120 may determine primary media content for playback and segment all or less than all of the media assets associated with the primary media content into asset modules based upon types and other criteria. Each of the asset modules may contain references to media assets and such references may be used by player application 120 to locate media assets on optical storage medium 110.

Moving on to step 420 in FIG. 4 and continuing to refer to media playback system 100 of FIG. 1, step 420 of flowchart 400 comprises assembling the plurality of asset modules created in step 410 into a media file. Each of the one or more asset modules may be a data file that may be stored together into a single media file for player application 120 to reference.

Proceeding to step 430 in FIG. 4 and continuing to refer to media playback system 100 of FIG. 1, step 430 of flowchart 400 comprises identifying a first subset of asset modules from the plurality of asset modules for loading in a first loading process. Step 430 may be performed by player application 120, for example, and may correspond to player application 120 identifying from the media file created in step 420 one or more asset modules that may be loaded into memory 130 prior to playback of primary media content. As explained earlier, identifying the first subset of asset modules may be based upon a predefined set of required media assets associated with the primary media content. In alternative embodiments of the invention, player application 120 may also use playback capabilities of the playback environment, user preferences, and user usage histories to identify the asset modules to load in the first loading process. In other embodiments of the invention, other methods may be used to identifying the asset modules as well.

Proceeding to step 440 in FIG. 4 and continuing to refer to media playback system 100 of FIG. 1, step 440 of flowchart 400 comprises determining a loading sequence for the subset of asset modules obtained from step 430. The loading sequence for the subset of asset modules may determine the order in which the media assets within the subset of asset modules may be loaded from optical storage medium 110 during a first loading process. As explained previously, player application 120 may determine the loading sequence by referring to a predefined required loading sequence associated with the primary media content. The loading sequence may also be based on at least one of playback capabilities of the playback environment, user preferences, and user usage histories. In other embodiments of the invention, other methods may be used to determine the loading sequence as well.

Proceeding to step 450 in FIG. 4 and continuing to refer to media playback system 100 of FIG. 1, step 450 of flowchart 400 comprises loading the subset of asset modules identified in step 430 according to the loading sequence determined in step 440 before playback of the primary media content begins on the playback environment. As previously described, during loading of media assets from optical storage medium 110, media playback system 100 may not be able to receive further user inputs, and the playback of the primary media content may be paused temporarily.

Proceeding to step 460 in FIG. 4 and continuing to refer to media playback system 100 of FIG. 1, step 460 of flowchart 400 comprises identifying one or more additional subsets of the plurality of asset modules after playback of the primary content has begun. After loading the first subset of media modules into memory 130 in step 450, player application 120 may identify additional asset modules of the remaining asset modules associated with the primary media content for loading at predefined execution moments, or in response to predefined execution events. As previously described, a predefined execution moment or event may be a user induced state change. A predefined execution moment or event may also be an instance in one of a main execution sequence associated with the primary media content or in a background execution sequence associated with the main execution sequence, or may correspond to a certain progression benchmark through such a main or background execution sequence. The instances in a main execution sequence or background execution sequence may be predefined or determined by player application 120 and/or optical storage medium 110.

Proceeding to step 470 in FIG. 4 and continuing to refer to media playback system 100 of FIG. 1, step 470 of flowchart 400 comprises determining another loading sequence for the one or more additional subsets of the plurality of asset modules. Similar to step 440, step 470 comprises player application 120 determining a loading sequence for loading the media assets in the additional subsets of the plurality of asset modules into memory 130.

Proceeding to step 480 in FIG. 4 and continuing to refer to media playback system 100 of FIG. 1, step 480 of flowchart 400 comprises loading the one or more additional subsets of the plurality of asset modules into memory 130 according to the loading sequence from step 470. Similar to step 450, step 480 includes progressively loading additional media assets into memory 130.

From the above description of the invention it is manifest that various techniques can be used for implementing the concepts of the present invention without departing from its scope. Moreover, while the invention has been described with specific reference to certain embodiments, a person of ordinary skills in the art would recognize that changes can be made in form and detail without departing from the spirit and the scope of the invention. As such, the described embodiments are to be considered in all respects as illustrative and not restrictive. It should also be understood that the invention is not limited to the particular embodiments described herein, but is capable of many rearrangement, modifications, and substitutions without departing from the scope of the invention.

What is claimed is:

1. A method for initializing media assets in a playback environment, the method comprising:
   segmenting media assets associated with a primary media content into a plurality of asset modules each including at least one of the media assets;
   assembling the plurality of asset modules into a media file;
   identifying a first subset of asset modules from the plurality of asset modules for loading in a memory for a first loading process, wherein the identifying of the first subset of asset modules is based on at least one of a playback capability of the playback environment, a user preference, and a user usage history;
   determining a loading sequence for the first subset of asset modules; and
   loading the first subset of asset modules according to the loading sequence.

2. The method of claim 1, further comprising:
   identifying one or more additional subsets of the plurality of asset modules for loading in another loading process;
   determining another loading sequence for the one or more additional subsets of the plurality of asset modules;
   loading the one or more additional subsets of the plurality of asset modules according to the another loading sequence.

3. The method of claim 1, wherein the segmenting comprises segmenting less than all of the media assets into the plurality of asset modules.

4. The method of claim 1, wherein the segmenting is performed according to at least one of a main execution sequence associated with the primary media content, and a background execution sequence associated with the main execution sequence.

5. The method of claim 1, wherein determining the loading sequence comprises receiving a predefined required loading sequence associated with the primary media content.

6. The method of claim 1, wherein identifying the one or more additional subsets of the plurality of asset modules is performed in response to a predefined execution event.

7. The method of claim 6, wherein the predefined execution event is selected from the group consisting of: a user induced state change of the playback environment, a progression through a main execution sequence associated with the primary media content, and a background execution sequence associated with the main execution sequence.

8. The method of claim 1, wherein the playback environment is a disc player.

9. A system for initializing media assets in a playback environment, the system comprising:
   a media playback system comprising a memory, a processor, and a player application controlling the memory and the processor, wherein the player application is configured to:
      segment media assets associated with a primary media content into a plurality of asset modules each including at least one of the media assets;
      assemble the plurality of asset modules into a media file;
      identify a first subset of asset modules from the plurality of asset modules for loading in the memory for a first loading process, wherein identifying the first subset of asset modules is based on at least one of a playback capability of the playback environment, a user preference, and a user usage history;
      determine a loading sequence for the first subset of asset modules; and
      load the first subset of asset modules according to the loading sequence.

10. The system of claim 9, wherein the player application is further configured to:
    identify one or more additional subsets of the plurality of asset modules for loading in another loading process;
    determine another loading sequence for the one or more additional subset of the plurality of asset modules; and
    load the one or more additional subsets of the plurality of asset modules according to the another loading sequence.

11. The system of claim 9, wherein the segmenting by the player application includes segmenting less than all of the media assets into the plurality of asset modules.

12. The system of claim 9, wherein the segmenting by the player application is performed according to at least one of a main execution sequence associated with the primary media content, and a background execution sequence associated with the main execution sequence.

13. The system of claim 9, wherein determining the loading sequence by the player application includes receiving a predefined required loading sequence associated with the primary media content.

14. The system of claim 9, wherein identifying the one or more additional subsets of the plurality of asset modules by the player application is performed in response to a predefined execution event.

15. The system of claim 14, wherein the predefined execution event is selected from the group consisting of: a user induced state change of the playback environment, a progression through a main execution sequence associated with the primary media content, and a background execution sequence associated with the main execution sequence.

16. The system of claim 9, wherein the playback environment is a disc player.

* * * * *